United States Patent
Hara et al.

(10) Patent No.: US 11,638,969 B2
(45) Date of Patent: May 2, 2023

(54) LASER-WELDED LAP JOINT, METHOD FOR PRODUCING LASER-WELDED LAP JOINT, AND AUTOMOBILE FRAME COMPONENT

(71) Applicant: JFE Steel Corporation, Tokyo (JP)

(72) Inventors: Asato Hara, Tokyo (JP); Yasushi Kitani, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 401 days.

(21) Appl. No.: 17/055,734

(22) PCT Filed: May 20, 2019

(86) PCT No.: PCT/JP2019/019838
§ 371 (c)(1),
(2) Date: Nov. 16, 2020

(87) PCT Pub. No.: WO2019/225528
PCT Pub. Date: Nov. 28, 2019

(65) Prior Publication Data
US 2021/0205924 A1    Jul. 8, 2021

(30) Foreign Application Priority Data

May 21, 2018 (JP) .............................. JP2018-096824

(51) Int. Cl.
*B23K 26/244* (2014.01)
*B23K 26/06* (2014.01)
(Continued)

(52) U.S. Cl.
CPC ........ *B23K 26/244* (2015.10); *B23K 26/0626* (2013.01); *B23K 2101/006* (2018.08); *B23K 2103/04* (2018.08)

(58) Field of Classification Search
CPC .............. B23K 26/244; B23K 26/0869; B23K 26/0626; B23K 2103/04; B23K 2101/006; B23K 2101/18
(Continued)

(56) References Cited

U.S. PATENT DOCUMENTS 9,705,384 B2 *   7/2017   Kaizu ...................... H02K 9/06
2003/0135197 A1   7/2003   Wang et al.
(Continued)

FOREIGN PATENT DOCUMENTS

CN    101870031 A    10/2010
CN    103111724 A    5/2013
(Continued)

OTHER PUBLICATIONS

Extended European Search Report for European Application No. 19 808 127.5, dated Oct. 11, 2021, 8 pages.
(Continued)

*Primary Examiner* — John J Norton
*Assistant Examiner* — Simpson A Chen
(74) *Attorney, Agent, or Firm* — RatnerPrestia (57) ABSTRACT

A laser-welded lap joint includes a weld zone formed by joining a plurality of steel sheets one over another together by laser welding. The weld zone has a J shape and includes a main weld zone having a linear weld line shape and a weld terminal end zone having an arcuate or circular weld line shape. The length $L_1$ of the main weld zone is ⅔ or more and ⅘ or less of the full length L of the weld zone represented by formula (1). The radius R of the weld terminal end zone satisfies formula (2). The angle θ of the weld terminal end zone satisfies formula (3). The total size of a gap between the plurality of steel sheets in a lapped portion is 0% or more and 15% or less of the total thickness of the plurality of steel sheets.

18 Claims, 5 Drawing Sheets

(51) Int. Cl.
  *B23K 103/04* (2006.01)
  *B23K 101/00* (2006.01)
(58) Field of Classification Search
  USPC .................................................. 219/121.64
  See application file for complete search history.

(56) References Cited

U.S. PATENT DOCUMENTS

| | | | |
|---|---|---|---|
| 2006/0163221 A1* | 7/2006 | Makase | ................ B23K 26/082 219/121.64 |
| 2019/0076963 A1 | 3/2019 | Hara | |

FOREIGN PATENT DOCUMENTS

| | | |
|---|---|---|
| CN | 203385696 U | 1/2014 |
| CN | 103934544 A | 7/2014 |
| DE | 19627913 A1 | 2/1997 |
| JP | 2006296236 | 12/2008 |
| JP | 2009154194 | 7/2009 |
| JP | 2012240083 | 12/2012 |
| JP | 2012240086 | 12/2012 |
| JP | 2017030647 | 2/2017 |
| JP | 2017113781 | 6/2017 |
| WO | 2017159425 | 9/2017 |

OTHER PUBLICATIONS

Chinese Office Action with Search Report for Chinese Application No. 201980032297.0, dated Dec. 24, 2021, 11 pages.
Japanese Office Action for Japanese Application No. 2019-543130, dated Aug. 4, 2020 with Concise Statement of Relevance of Office Action, 4 pages.
International Search Report and Written Opinion for International Application No. PCT/JP2019/019838, dated Jul. 16, 2019, 5 pages.
Korean Office Action for Korean Application No. 10-2020-7033332, dated Sep. 13, 2021, with Concise Statement of Relevance of Office Action, 6 pages.

* cited by examiner

LASER-WELDED LAP JOINT, METHOD FOR PRODUCING LASER-WELDED LAP JOINT, AND AUTOMOBILE FRAME COMPONENT

CROSS REFERENCE TO RELATED APPLICATIONS

This is the U.S. National Phase application of PCT/JP2019/019838, filed May 20, 2019, which claims priority to Japanese Patent Application No. 2018-096824, filed May 21, 2018, the disclosures of these applications being incorporated herein by reference in their entireties for all purposes.

FIELD OF THE INVENTION

The present invention relates to a laser-welded lap joint, to a method for producing the laser-welded lap joint, and an automobile frame component including the laser-welded lap joint.

BACKGROUND OF THE INVENTION

Resistance spot welding has conventionally been used for welding of automobile structural members having flange portions. However, resistance spot welding has the following problems: the welding is time consuming; a pitch cannot be reduced because the amount of heat generated decreases due to shunt current; and there are spatial limitations due to a gun of the welder. In recent years, to solve these problems, it has been contemplated to use laser lap welding in addition to the conventional resistance spot welding. The laser lap welding is a welding method in which a surface of a plurality of lapped steel sheets is irradiated with a laser beam to join the steel sheets together.

In the laser lap welding, a surface of a plurality of lapped steel sheets is irradiated linearly with a laser beam. The portion of the steel sheets irradiated with the laser beam is fused and solidified, and a fusion zone (weld zone) is thereby formed. In this manner, the lapped steel sheets are joined together, and a laser-welded lap joint can be obtained. However, one problem with the laser lap welding is that cracking is likely to occur at the terminal end side of the linear fusion zone. Once a crack occurs, the crack propagates over the entire length of the fusion zone. It is feared that the propagation of the crack formed in the weld metal may cause a reduction in static strength such as shear strength and peeling strength of the lap-welded joint portion and also a significant reduction in fatigue strength due to propagation of cracks from the initial crack. In recent years, high-tensile steel sheets with increased strength are being used for automobile body components, particularly frame components, in order to improve the strength and stiffness of automobile bodies, and a reduction in static strength and fatigue strength of joints due to cracks in weld zones is a serious problem.

Accordingly, various techniques have been disclosed as methods for preventing the occurrence and propagation of cracks in laser lap weld zones that are formed when lapped steel sheets are laser-welded lap.

For example, Patent Literature 1 discloses a technique for preventing weld cracking by disposing a lower steel sheet to be lap-welded so as to protrude and setting a welding start position to be spaced apart from an edge of a flange. Patent Literature 2 discloses a technique for preventing weld cracking by irradiating an edge portion of lapped surfaces with a laser beam obliquely. Patent Literature 3 and Patent Literature 4 disclose techniques for preventing weld cracking by reheating or welding an already welded portion or a peripheral portion of the welded portion. Patent Literature 5 discloses a technique for preventing the occurrence of weld cracking by welding lapped surfaces elliptically.

PATENT LITERATURE

PTL 1: Japanese Unexamined Patent Application Publication No. 2009-154194
PTL 2: Japanese Unexamined Patent Application Publication No. 2008-296236
PTL 3: Japanese Unexamined Patent Application Publication No. 2012-240083
PTL 4: Japanese Unexamined Patent Application Publication No. 2012-240086
PTL 5: Japanese Unexamined Patent Application Publication No. 2017-113781

SUMMARY OF THE INVENTION

However, in the method described in Patent Literature 1, since the lower steel sheet to be lap-welded is disposed so as to protrude, the protruding portion is redundant, and the design of components is disadvantageously restricted.

In the method described in Patent Literature 2, when a gap is present between lapped sheets, a fusion zone is not well formed on the lapped surfaces, and this results in incomplete penetration. Therefore, disadvantageously, it is difficult to obtain sufficient strength.

In the methods described in Patent Literature 3 and Patent Literature 4, an already welded portion or a peripheral portion of the welded portion is reheated or welded. Therefore, disadvantageously, additional welding time for reheating or welding is required.

In the method described in Patent Literature 5, lapped surfaces are welded elliptically. Therefore, the method is not applicable to weld cracking in linear weld zones.

Aspects of the present invention have been made in view of the foregoing problems, and it is an object to provide a laser-welded lap joint in which the occurrence of a crack in a terminal end portion of a fusion zone and the propagation of the crack can be prevented and which has good joint strength and to provide a method for producing the laser-welded lap joint and an automobile frame component including the laser-welded lap joint.

The present inventors have conducted studies to solve the foregoing problems and obtained the following findings.

In accordance with aspects of the present invention, attention is given to the full length of a fusion zone, the shape of a weld line, the total thickness of a plurality of lapped steel sheets, and the total size of gaps between the plurality of lapped steel sheets. The present inventors have found that, to prevent the occurrence of cracking on the terminal end side of the fusion zone, controlling the full length of the fusion zone and controlling the shape of the weld line are effective. Specifically, the inventors have found that, when the weld line has a J shape satisfying formulas (1) to (3) below, the occurrence of a crack on the terminal end side of the fusion zone and the propagation of the crack can be prevented. In accordance with aspects of the present invention, the fusion zone and a heat-affected zone are collectively referred to as a weld zone.

$$10 \text{ mm} \leq L \tag{1}$$

$$0.5 \leq R \leq 1.5 \tag{2}$$

$$\tfrac{5}{6}\pi \leq \theta \leq 2\pi \tag{3}$$

Here, L is the full length (unit: mm) of the weld zone, and R is the radius (unit: mm) of a weld terminal end zone in the weld zone. θ is the angle (unit: rad) of the weld terminal end zone in the weld zone.

Moreover, the inventors have found that, by controlling at least one of the total thickness of the plurality of lapped steel sheets and the total size of gaps between the plurality of lapped steel sheets, stress concentration on the fusion zone on the lapped surfaces can be reduced and the peeling strength can be further improved.

Aspects of the present invention have been made based on the above findings and are summarized as follows.

[1] A laser-welded lap joint including a weld zone formed by joining a plurality of steel sheets lapped one over another together by laser welding, wherein the weld zone has a J shape and includes a main weld zone having a linear weld line shape and a weld terminal end zone formed at one end of the main weld zone and having an arcuate or circular weld line shape, wherein the length $L_1$ (mm) of the main weld zone is ⅔ or more and ⅘ or less of the full length L (mm) of the weld zone that is represented by formula (1), wherein the radius R (mm) of the weld terminal end zone satisfies formula (2), wherein the angle θ (rad) of the weld terminal end zone satisfies formula (3), and wherein the total size of a gap or gaps between the plurality of steel sheets in a lapped portion including the plurality of steel sheets lapped one over another is 0% or more and 15% or less of the total thickness of the plurality of steel sheets:

$$10.0 \le L; \tag{1}$$

$$0.5 \le R \le 1.5; \tag{2}$$

$$\tfrac{5}{6}\pi \le \theta \le 2\pi, \tag{3}$$

where L is the full length (unit: mm) of the weld zone, R is the radius (unit: mm) of the weld terminal end zone in the weld zone, and θ is the angle (unit: rad) of the weld terminal end zone in the weld zone.

[2] The laser-welded lap joint according to [1], wherein at least one steel sheet of the plurality of steel sheets has a chemical composition containing, in mass %:
C: more than 0.07% and 0.25% or less;
P+S: less than 0.03%;
Mn: 1.8% or more and 3.0% or less; and
Si: more than 1.2% and 1.8% or less,
with the balance being Fe and unavoidable impurities.

[3] The laser-welded lap joint according to [1] or [2], further containing, in addition to the chemical composition, one or two selected from the following groups A and B:
group A: in mass %, one or two selected from Ti: 0.005% or more and 0.01% or less and Nb: 0.005% or more and less than 0.050%, and
group B: in mass %, one or two or more selected from Cr: 1.0% or less, Mo: 0.50% or less, and B: 0.10% or less.

[4] The laser-welded lap joint according to any one of [1] to [3], wherein at least one steel sheet of the plurality of steel sheets is a high-tensile steel sheet with a tensile strength of 980 MPa or more.

[5] The laser-welded lap joint according to any one of [1] to [4], wherein at least one steel sheet of the plurality of steel sheets has a substantially hat-shaped or L-shaped cross section and has a vertical wall portion and a flange portion extending outward from one end of the vertical wall portion, and wherein, in a coordinate system in which the coordinate of a vertical wall portion-side end of a joint surface between the flange portion and another one of the steel sheets that is lapped on the flange portion is set to 0, in which a vertical wall portion side is set to (+), and in which an outer end side of the flange portion that is opposite to the vertical wall portion side is set to (−), the weld zone is located at a welding position X (mm) represented by formula (4)

$$-2t \ge X \ge -4t \tag{4}$$

where t is the thickness (unit: mm) of a thickest steel sheet of the plurality of steel sheets.

[6] A method for producing the laser-welded lap joint according to any one of [1] to [5], the method including: lapping the plurality of steel sheets vertically one over another; and forming the weld zone by applying a laser beam to a surface of an upper steel sheet of the plurality of steel sheets lapped one over another.

[7] The method for producing the laser-welded lap joint according to [6], wherein the J shape is formed by controlling at least one of laser power, a focal position, welding speed, and a beam diameter such that the length $L_1$ (mm) of the main weld zone is ⅔ or more and ⅘ or less of the full length L (mm) of the weld zone that is represented by formula (1), that the radius R (mm) of the weld terminal end zone satisfies formula (2), and that the angle θ (rad) of the weld terminal end zone satisfies formula (3).

[8] An automobile frame component including the laser-welded lap joint according to any one of [1] to [5].

According to aspects of the present invention, the occurrence of cracking in a terminal end portion of the fusion zone and propagation of the cracking can be prevented, and therefore the laser-welded lap joint produced can have good joint strength. Since the laser-welded lap joint according to aspects of the present invention has excellent appearance, the laser-welded lap joint is preferable for structural components of automobiles and allows an automobile frame component to be produced.

DETAILED DESCRIPTION OF EMBODIMENTS OF THE INVENTION

The laser-welded lap joint according to aspects of the present invention, a method for producing the laser-welded lap joint, and an automobile frame component will be described with reference to the drawings. However, the present invention is not limited to the embodiments.

<Laser-Welded Lap Joint>

The laser-welded lap joint according to aspects of the present invention includes a weld zone formed by joining a plurality of lapped steel sheets together by laser welding. The weld zone includes a main weld zone having a linear weld line shape and a weld terminal end zone formed at one end of the main weld zone and having an arcuate weld line shape. The weld zone is formed into a J shape. The length $L_1$ (mm) of the main weld zone is ⅔ or more and ⅘ or less of the full length L (mm) of the weld zone represented by formula (1) below, and the radius R (mm) of the weld terminal end zone satisfies formula (2) below. The angle θ (rad) of the weld terminal end zone satisfies formula (3) below.

$$10.0 \leq L \tag{1}$$

$$0.5 \leq R \leq 1.5 \tag{2}$$

$$\tfrac{5}{6}\pi \leq \theta \leq 2\pi \tag{3}$$

Here, L is the full length (unit: mm) of the weld zone, R is the radius (unit: mm) of the weld terminal end zone in the weld zone, and θ is the angle (unit: rad) of the weld terminal end zone in the weld zone.

Figure 1:
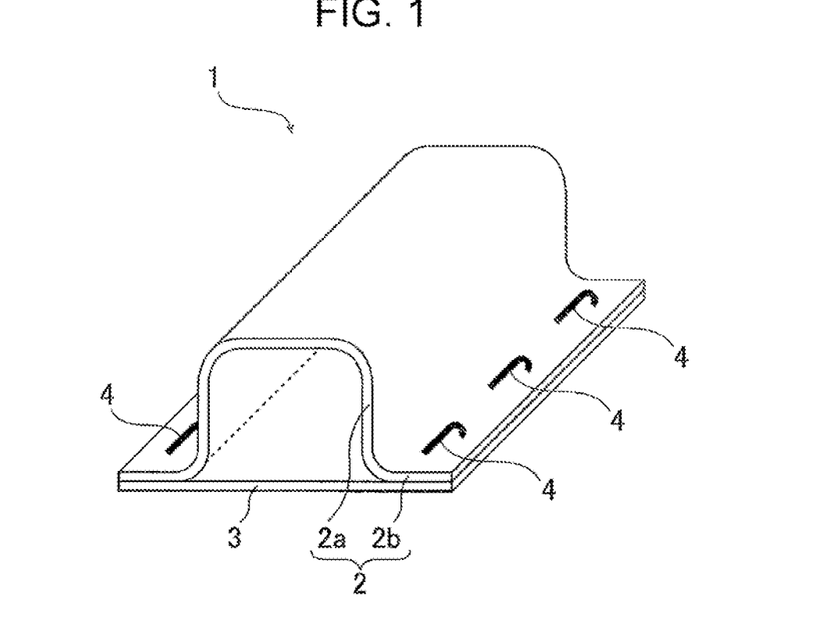
FIG. 1 is a perspective view showing an example of the laser-welded lap joint according to aspects of the present invention.
Figure 2:
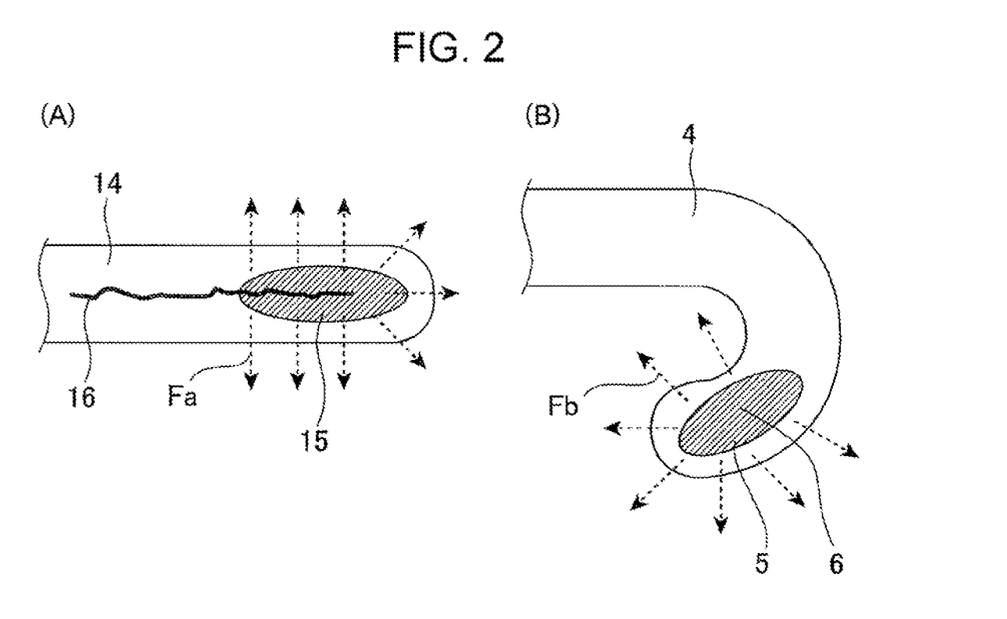
FIG. 2(A) is a schematic illustration showing a weld terminal end portion of a conventional laser-welded lap joint.
FIG. 2(B) is a schematic illustration showing a weld terminal end portion in the laser-welded lap joint according to aspects of the present invention.
Figure 3:
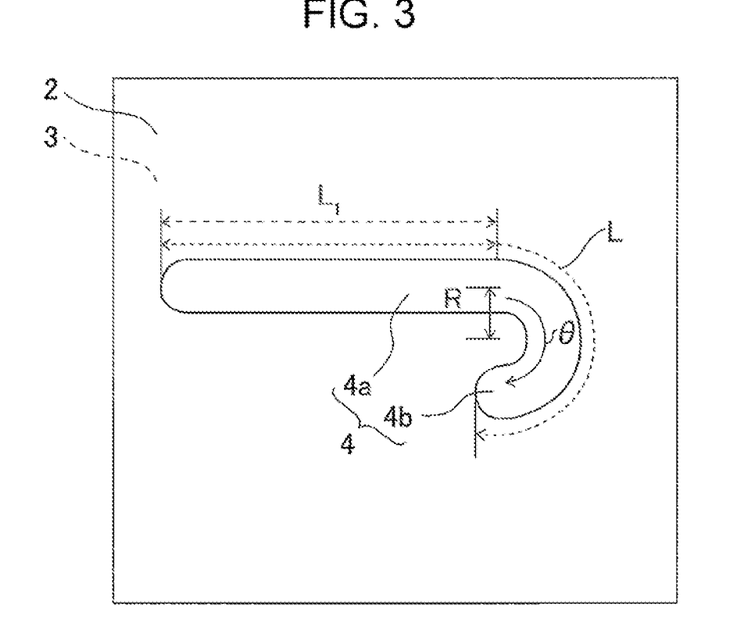
FIG. 3 is a top view showing the structure of a weld zone (fusion zone) of the laser-welded lap joint according to aspects of the present invention.
Figure 4:
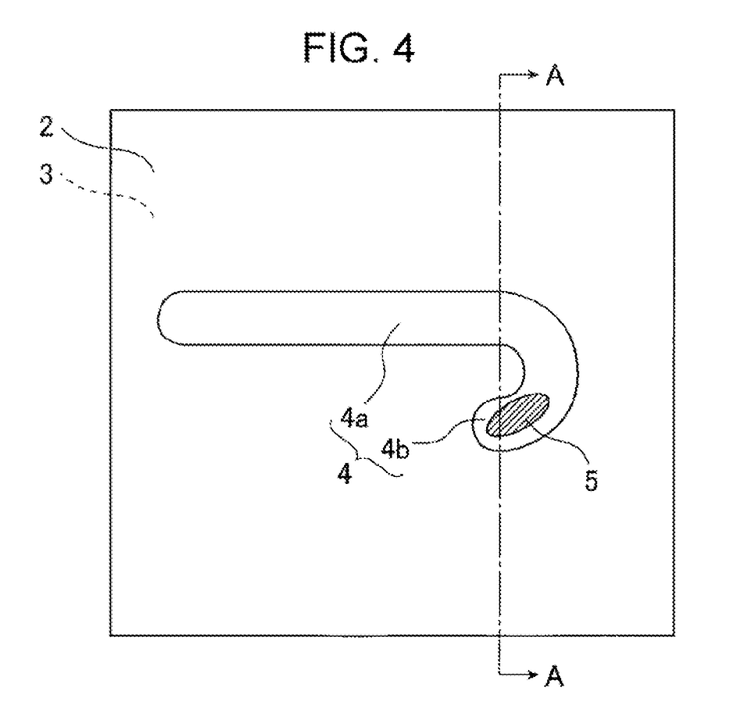
FIG. 4 is a top view showing the structure of the weld zone (fusion zone) of the laser-welded lap joint according to aspects of the present invention.
Figure 5:
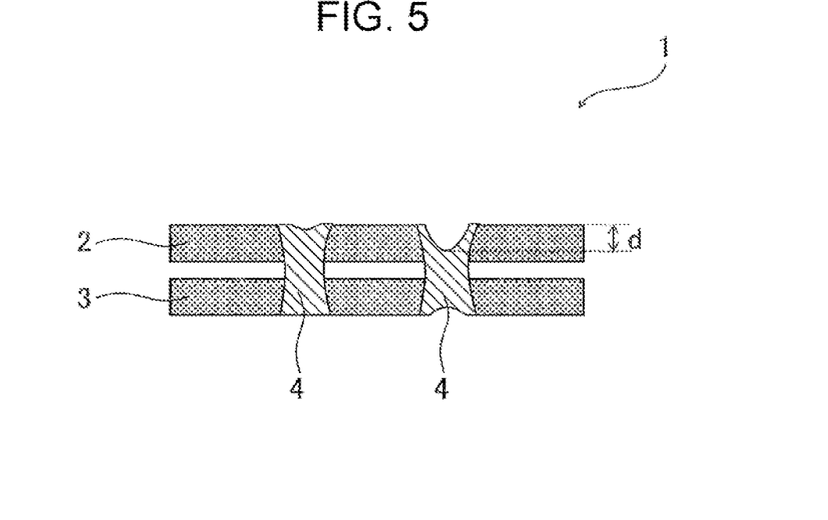
FIG. 5 is a cross-sectional view of the laser-welded lap joint taken along line A-A in FIG. 4.

An embodiment of the laser-welded lap joint 1 according to aspects of the present invention will be described using FIGS. 1 to 5. FIG. 1 is a perspective view showing an example of the laser-welded lap joint 1 according to aspects of the present invention. FIG. 2(A) is a schematic illustration showing a weld terminal end portion of a conventional laser-welded lap joint, and FIG. 2(B) is a schematic illustration showing a weld terminal end portion of the laser-welded lap joint according to aspects of the present invention. FIGS. 3 and 4 are top views showing the structure of a weld zone 4 in the laser-welded lap joint according to aspects of the present invention. FIG. 5 is a cross-sectional view taken along line A-A shown in FIG. 4.

Referring first to FIG. 1, the laser-welded lap joint 1 according to aspects of the present invention will be described.

In the laser-welded lap joint 1 according to aspects of the present invention, at least two steel sheets are lapped one over another. In the example shown in FIG. 1, two steel sheets, i.e., a steel sheet 2 having a substantially hat-shaped cross-sectional shape and including a vertical wall portion 2a and a flange portion 2b extending outward from an end of the vertical wall portion 2a and a flat panel-shaped steel sheet 3, are used. The steel sheet 2 and the steel sheet 3 are lapped so as to face each other, and a region of the flange portion 2b of the steel sheet 2 serves as a joint surface. The two lapped steel sheets 2 and 3 are joined in the flange portion 2b by laser lap-welding. In the laser lap welding, a fusion zone that penetrates at least one of the steel sheets 2 and 3 to join the steel sheets 2 and 3 together is formed. The fusion zone and a heat-affected zone form a weld zone 4.

The laser lap welding is performed by applying a laser beam 7 intermittently along the vertical wall portion 2a while the laser beam 7 is moved in a longitudinal direction. In this manner, as shown in FIG. 1, a plurality of weld zones 4 having a substantially J-shaped surface shape are formed on the joint surface of the steel sheets 2 and 3. In the example described in this case, the two steel sheets 2 and 3 are lapped to form the laser-welded lap joint 1 according to aspects of the present invention. However, three or more steel sheets may be lapped.

Referring next to FIGS. 2 to 5, the technical idea according to aspects of the present invention and the structure of the weld zones 4 will be described.

FIG. 2(A) shows a terminal end portion 15 of a weld zone 14 in a conventional laser-welded lap joint, and FIG. 2(B) shows a terminal end portion 5 of a weld zone 4 in the laser-welded lap joint according to aspects of the present invention.

In the welding using a conventional laser welder, the welding state is unstable in the initial stage of the welding. When welding is performed in this unstable state while the welding direction is changed so as to form, for example, an arcuate shape, a larger amount of spatters are generated. Therefore, the terminal end portion 15 of the weld zone 14 is generally formed so as to have a linear shape. However, it has been found that, when the terminal end portion 15 of the weld zone 14 in the laser-welded lap joint is formed into a linear shape as shown in FIG. 2(A), tensile stress is concentrated on the terminal end portion 15 of the weld zone.

Specifically, tensile stress directed from the outer circumference of the fusion zone 14 toward the outside (force in the direction of an arrow Fa shown in FIG. 2(A)) is concentrated on a central portion, which is a final solidification zone, of the terminal end portion 15. In this case, solidification cracking 16 is likely to occur. When the solidification cracking occurs, weld cracking may result in, and weld defects may be generated in the laser-welded lap joint.

However, as shown in FIG. 2(B), when the terminal end portion 5 of the weld zone 4 in the laser-welded lap joint is formed into a specific shape, i.e., an arcuate or circular shape, the tensile stress can be dispersed in the terminal end portion 5 of the weld zone. Specifically, the tensile stress directed from the outer circumference of the fusion zone 4 toward the outside (force in the direction of an arrow Fb shown in FIG. 2(B)) is not concentrated on one point in a central portion 6 of the final solidification zone in the terminal end portion 5 but can be dispersed. In this case, the occurrence of solidification cracking is prevented, and the occurrence of weld defects in the laser-welded lap joint can be prevented.

On the basis of the above technological idea, in the laser-welded lap joint 1 according to aspects of the present invention, it is important that the dimensions of the surface of the weld zone 4 formed into the substantially J shape be adjusted within the prescribed ranges.

Specifically, as shown in FIG. 3, the weld zone 4 includes a main weld zone 4a having a linear weld line shape and a weld terminal end zone 4b formed continuously with one end of the main weld zone 4a and having an arcuate or circular weld line shape extending to the terminal end of the weld zone. The length $L_1$ (mm) of the main weld zone 4a is ⅔ or more and ⅘ or less of the full length L (mm) of the weld zone 4 that is represented by formula (1) above. The radius R (mm) of the weld terminal end zone 4b satisfies formula (2) above, and the angle θ (rad) of the weld terminal end zone 4b satisfies formula (3) above.

The radius R and the angle θ are measured on a center line of the weld zone 4. The length $L_1$ of the main weld zone 4a is measured on a center line Z of the main weld zone 4a.

(Full Length L (Mm) of Weld Zone 4: 10.0 mm≤L)

If the full length L of the weld zone 4 is shorter than 10.0 mm, a sufficient joint area is not obtained, and the joint strength is low. Moreover, since the amount of molten metal is small, the occurrence of cracking cannot be prevented, and a reduction in peeling strength occurs. Therefore, the full length L of the weld zone 4 is 10.0 mm or more (formula (1) above). Preferably, the full length L of the weld zone 4 is 15.0 mm or more. The upper limit of the full length L of the weld zone 4 is not particularly specified. However, from the viewpoint of the welding time of the components, the full length L of the weld zone 4 is preferably 40.0 mm or less and more preferably 30.0 mm or less. As shown in FIG. 3, the full length L of the weld zone 4 is the sum of the length $L_1$ of the main weld zone 4a and the length of the center line of the weld terminal end zone 4b.

(Length $L_1$ (Mm) of Main Weld Zone 4a: L×⅔≤$L_1$≤L×⅘)

If the length $L_1$ of the main weld zone 4a is shorter than "L×⅔" (mm), the linear portion formed is insufficient. This is unsuitable because the short linear portion receives a load and sufficient peeling strength is not obtained. If the length $L_1$ of the main weld zone 4a is longer than "L×⅘" (mm), the curved portion formed is not sufficient. This in unsuitable because stress concentration occurs and sufficient peeling strength is not obtained. Therefore, the length $L_1$ of the main weld zone 4a is L×⅔≤$L_1$≤L×⅘. The length $L_1$ of the main weld zone 4a is preferably 15.0 mm or more and is preferably 40.0 mm or less.

(Radius R (Mm) of Weld Terminal End Zone 4b: 0.5 mm≤R≤1.5 mm)

If the radius R of the weld terminal end zone 4b formed into an arcuate or circular shape is less than 0.5 mm, the ratio of a crater portion to the terminal end portion 5 of the weld zone 4 is large, and the occurrence of weld cracking cannot be prevented. If the radius R of the weld terminal end zone 4b is larger than 1.5 mm, the above-described effect of dispersing tensile stress cannot be obtained sufficiently, and the occurrence of weld cracking cannot be prevented. Therefore, the radius R of the weld terminal end zone 4b is 0.5 mm R 1.5 mm (formula (2) above). The radius R of the weld terminal end zone 4b is preferably 0.7 mm or more and is preferably 1.3 mm or less.

Next, a cross section of the terminal end portion 5 of the weld zone 4 in accordance with aspects of the present invention will be described using FIGS. 4 and 5. FIG. 5 is a cross-sectional view taken along line A-A shown in FIG. 4. As shown in FIG. 5, a terminal end portion of the weld zone 4 has a concave shape and is generally referred to as a crater. As described above, when the radius R of the weld terminal end zone 4b is less than 0.5 mm, the depth d of the crater portion is large, and weld cracking is likely to occur.

(Angle θ (Rad) of Weld Terminal End Zone 4b: ⅚π Rad≤θ≤2π Rad)

If the angle θ of the weld terminal end zone 4b formed into an arcuate or circular shape is smaller than ⅚π rad, the above-described effect of dispersing tensile stress cannot be obtained sufficiently, and the occurrence of weld cracking cannot be prevented. If the angle θ of the weld terminal end zone 4b is larger than 2π rad, the occurrence of weld cracking can be prevented. However, new problems such as an increase in welding time and an increase in the size of the heat affected zone occur. Therefore, the angle θ of the weld terminal end zone 4b is ⅚π rad≤θ≤2π rad (formula (3) above). The angle θ of the weld terminal end zone 4b is preferably π rad<θ and is preferably θ≤³⁄₂π rad or less.

As described above, the weld zone 4 in accordance with aspects of the present invention is formed such that the main weld zone 4a and the weld terminal end zone 4b fall within the above-described ranges, so that the tensile stress (the force in the direction of the arrow Fb) generated in the central portion of the final solidification zone at the terminal end of the weld zone can be effectively dispersed. The occurrence of weld cracking in the terminal end portion of the fusion zone can thereby be prevented. Therefore, although the minimum value of the full length L of the fusion zone 4 is short, i.e., 10.0 mm, as shown in FIG. 3, the occurrence of weld defects in the terminal end portion of the weld zone can be prevented.

(Ratio of Total Size (Mm) of Gaps Between Plurality of Steel Sheets to Total Thickness (Mm) of Steel Sheets: 0% or More and 15% or Less)

Figure 9:
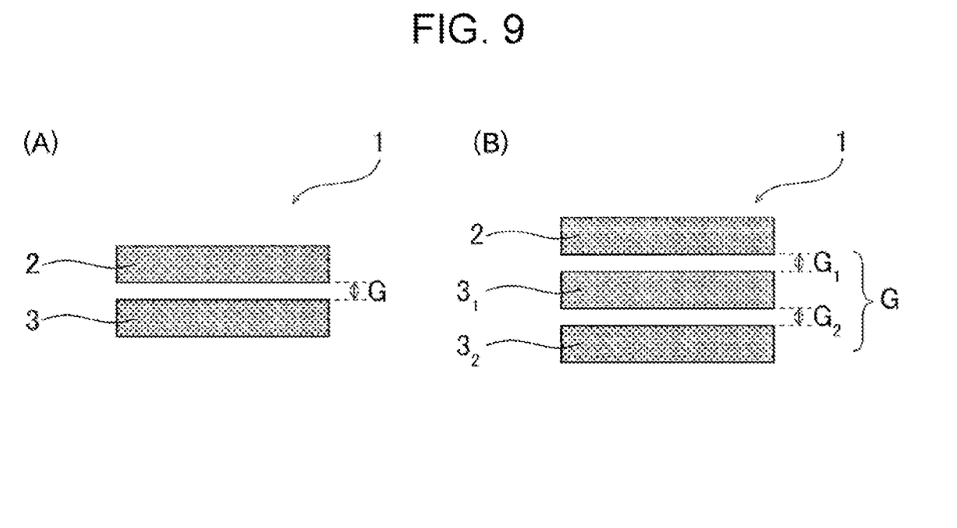
FIG. 9(A) is an illustration showing the total size of gaps between steel sheets when two steel sheets are lapped.
FIG. 9(B) is an illustration showing the total size of gaps between steel sheets when three steel sheets are lapped.

In accordance with aspects of the present invention, the total size of gaps between the steel sheets (in the example shown in FIG. 5, the gap between the steel sheets 2 and 3) in the lapped portion including the plurality of lapped steel sheets is 0% or more and 15% or less of the total thickness (mm) of the plurality of steel sheet. Referring to FIG. 9, the total size G of gaps between the steel sheets in the lapped portion including the plurality of lapped steel sheets will be described. FIG. 9(A) is a cross-sectional view of a laser-welded lap joint 1 including two lapped steel sheets 2 and 3, and FIG. 9(B) is a cross-sectional view of a laser-welded lap joint 1 including three lapped steel sheets 2, $3_1$, and $3_2$. When two steel sheets 2 and 3 are lapped as shown in FIG. 9(A), the total size G of gaps between the steel sheets is the size of the gap between the steel sheets 2 and 3. When three steel sheets are lapped as shown in FIG. 9(B), the total size G of gaps between the steel sheets is the sum of the size $G_1$ of the gap between the steel sheets 2 and $3_1$ and the size $G_2$ of the gap between the steel sheets $3_1$ and $3_2$. In the examples shown in FIG. 9, each laser-welded lap joint 1 includes 2 or 3 lapped steel sheets. However, 4 or more steel pipes may be lapped. Specifically, when the steel sheet 2 and N steel sheets $3_1$ to $3_N$ (N is an integer of 2 or more) are lapped, the sum of the size $G_1$ of the gap between the steel sheets 2 and $3_1$, the size $G_2$ of the gap between the steel sheets $3_1$ and $3_2$, and sizes of the gaps between other steel sheets such as the steel sheets $3_n$ and $3_{n+1}$ (n is an integer satisfying 2≤n<N) is the total size G of gaps between the steel sheets. In other words, the total size G of gaps between the steel sheets is the sum of the sizes of the gaps between adjacent lapped steel sheets ($G=G_1+G_2+\ldots+G_{N-1}+G_N$). When the ratio of the total size (total sheet gap) G (mm) of the gaps between the steel sheets to the total thickness T (mm) of the plurality of steel sheets is 0% or more and 15% or less, the concentration of stress on the fusion zone on the lapped surfaces can be reduced, and therefore the peeling strength can be improved while the occurrence of weld cracking is prevented. However, if the ratio of the total sheet gap exceeds 15%, weld cracking occurs, and the strength is lower than that when no gaps are present. The ratio of the total size (mm) of gaps between the steel sheets to the total thickness (mm) of the plurality of steel sheets is preferably 5% or more and more preferably 10% or less.

The laser-welded lap joint 1 according to aspects of the present invention is configured as described above, and the target characteristics according to aspects of the invention can thereby be obtained. However, the following optional structural features may be added in addition to the above described structural features.

(Chemical Composition of Steel Sheets)

No particular limitation is imposed on the chemical composition of the steel sheets used for the laser-welded lap joint 1 according to aspects of the present invention. The chemical composition may contain, in mass %, for example, C: more than 0.07% and 0.25% or less, P+S: less than 0.03%, Mn: 1.8% or more and 3.0% or less, and Si: more than 1.2% and 1.8% or less, with the balance being Fe and unavoidable impurities. % in the chemical composition means % by mass.

(C: More than 0.07% and 0.25% or Less)

When the content of C exceeds 0.07%, the effect of precipitation strengthening can be obtained. When the content of C is 0.25% or less, coarse carbide precipitates may not be formed, and desired high strength and desired workability can be obtained. Therefore, the content of C is preferably more than 0.07% and 0.25% or less. More preferably, the content of C is 0.10% or more and 0.20% or less.

(P+S: Less than 0.03%)

When the total of the content of P and the content of S (P+S) is less than 0.03%, ductility and toughness do not deteriorate, and the desired high strength and the desired workability can be obtained. Therefore, the total (P+S) of the content of P and the content of S is preferably less than 0.03%.

(Mn: 1.8% or More and 3.0% or Less)

When the content of Mn is 1.8% or more, sufficient hardenability can be obtained, so that coarse carbide precipitates are unlikely to be formed. When the content of Mn is 3.0% or less, susceptibility to grain boundary embrittlement decreases, and toughness and resistance to low-temperature cracking are unlikely to deteriorate. Therefore, the content of Mn is preferably 1.8% or more and 3.0% or less. The content of Mn is more preferably 2.5% or less.

(Si: More than 1.2% and 1.8% or Less)

When the content of Si is more than 1.2%, the effect of increasing the strength of the steel by solid solution strengthening can be obtained sufficiently. When the content of Si is 1.8% or less, the heat-affected zone is less likely to be excessively hardened, and the toughness of the heat-affected zone and its resistance to low-temperature cracking are unlikely to deteriorate. Therefore, the content of Si is preferably more than 1.2% and 1.8% or less. More preferably, the content of Si is 1.5% or less.

(Balance: Fe and Unavoidable Impurities)

The balance of the chemical composition is Fe and unavoidable impurities. Examples of the unavoidable impurities include Al: 0.015 to 0.050% and N: 0.002 to 0.005%.

Moreover, to further improve the strength of the steel sheets and their joint strength, one or two selected from the following group A and group B may be optionally contained in addition to the above-described chemical composition.

(Group A: In Mass %, One or Two Selected from Ti: 0.005% or More and 0.01% or Less and Nb: 0.005% or More and Less than 0.050%)

Ti and Nb precipitate as carbides or nitrides and have the effect of preventing austenite from coarsening during annealing. Therefore, when Ti and/or Nb is contained, it is preferable to contain at least one of them. When Ti and/or Nb is contained in order to obtain the above effect, Ti is contained in an amount of 0.005% or more, and/or Nb is contained in an amount of 0.005% or more. Even though excessively large amounts of these elements are contained, the efficacy of the above effect is saturated, and this may rather be uneconomical. Moreover, the recrystallization temperature during annealing increases, and the metallographic structure after annealing may become nonuniform, so that stretch flangeability may deteriorate. In addition, the amount of precipitated carbides or nitrides may increase. In this case, an increase in yield ratio may occur, and deterioration in shape fixability may also occur. Therefore, when Ti and/or Nb is contained, the content of Ti is 0.01% or less, and the content of Nb is less than 0.050%. The content of Ti is preferably less than 0.0080%. The content of Nb is more preferably less than 0.040%.

(Group B: In Mass %, One or Two or More Selected from Cr: 1.0% or Less, Mo: 0.50% or Less, and B: 0.10% or Less)

Cr, Mo, and B are elements having the effect of improving the hardenability of the steel. Therefore, at least one of these elements may be contained. However, even though excessively large amounts of these elements are contained, the above effect is saturated, and this may rather be uneconomical. Therefore, when Cr, Mo, and B are contained, the content of Cr is 1.0% or less, the content of Mo is 0.50% or less, and the content of B is 0.10% or less. The content of Cr is preferably 0.01% or more. The content of Mo is preferably 0.004% or more. The content of B is preferably 0.0001% or more. The content of Cr is preferably 0.50% or less. The content of Mo is preferably 0.10% or less. The content of B is preferably 0.0030% or less.

(Tensile Strength of Steel Sheets)

At least one steel sheet of the plurality of steel sheets used for the laser-welded lap joint 1 according to aspects of the present invention may be a high-tensile steel sheet having a tensile strength TS of 980 MPa or more. Even when at least one steel sheet is the above high-tensile steel sheet, the laser-welded joint 1 can have high joint strength, and the occurrence of weld defects can be prevented. Preferably, for example, at least one steel sheet of the plurality of steel sheets has the above-described chemical composition and has a tensile strength TS of 980 MPa or more. The plurality of steel sheets may be of the same type and may have the same shape, but different types of steel sheets or steel sheets with different shapes may be used.

(Thicknesses of Steel Sheets)

In accordance with aspects of the present invention, no particular limitation is imposed on the respective thicknesses t' of the plurality of steel sheets to be subjected to laser welding. However, the thicknesses are preferably within the range of, for example, 0.5 mm≤t'≤2.5 mm. Steel sheets with thicknesses within the above range can be used preferably for automobile exterior body panels and automobile frame components. The thicknesses of the plurality of steel sheets may be the same or different.

Specifically, in the laser-welded joint 1 shown in FIG. 1 etc., it is preferable that the thickness t'2 of the upper steel sheet 2 satisfies 0.6 mm≤t'≤1.2 mm and that the thickness t'3 of the lower steel sheet 3 satisfies 1.0 mm≤t'3≤2.5 mm. Alternatively, it is preferable that the thickness t'2 of the upper steel sheet 2 and the thickness t'3 of the lower steel sheet 3 fall within the ranges of 0.5 mm≤t'2≤2.5 mm and 0.5 mm≤t'3≤2.5 mm.

The "weld cracking" in accordance with aspects of the present invention is low-temperature cracking that occurs at the welding terminal end portion of the weld zone 4 and propagates from the welding terminal end point to a welding starting end portion. The presence or absence of the weld cracking can be determined by cutting the weld zone 4 after welding and checking the presence or absence of cracking. The presence or absence of cracking can be checked by visual inspection. To check the presence of cracking more clearly, it is preferable to observe the cross section, for example, under an optical microscope at a magnification of about 10x. Weld cracking penetrates the weld zone 4 from the front surface to the back surface.

<Method for Producing Laser-Welded Lap Joint>

Figure 6:
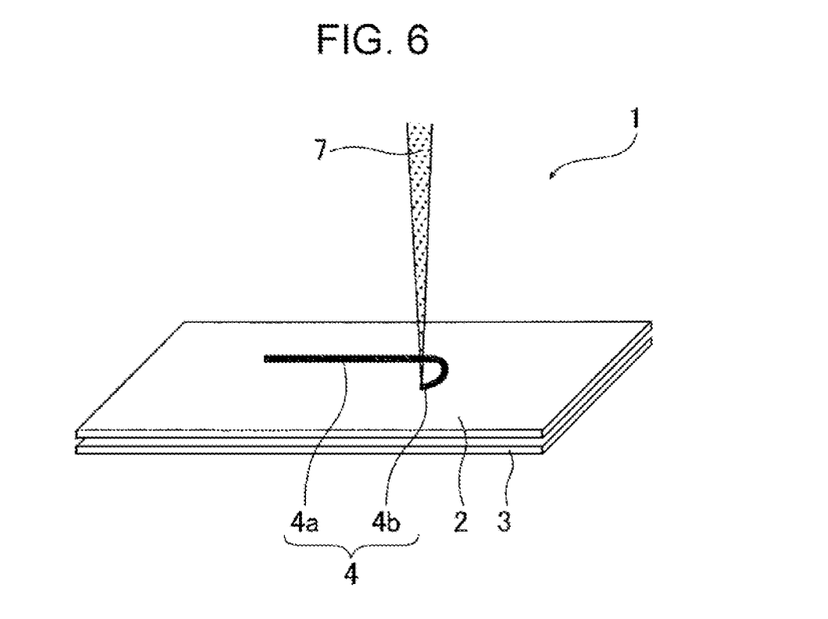
FIG. 6 is a perspective view illustrating a welding method for the laser-welded lap joint according to aspects of the present invention.
Figure 7:
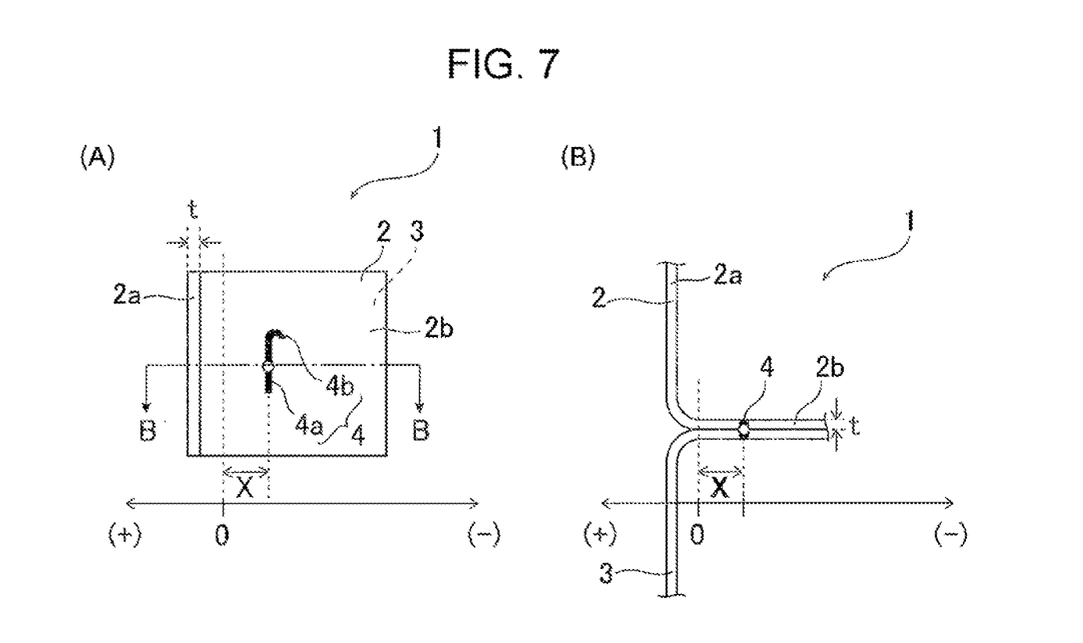
FIG. 7(A) is a top view illustrating the position of the weld zone (fusion zone) in the laser-welded lap joint according to aspects of the present invention.
FIG. 7(B) is a cross-sectional view taken along line B-B in FIG. 7(A).

Next, a method for producing the laser-welded lap joint 1 according to aspects of the present invention will be described using FIGS. 6 and 7. FIG. 6 is an illustration showing an example of the method for producing the laser-welded lap joint 1 according to aspects of the present invention. FIG. 7 shows an illustration of an example of a preferred position of a weld zone (fusion zone) 4 in the laser-welded lap joint 1 according to aspects of the present invention. FIG. 7(A) is a top view showing a combination of two steel sheets 2 and 3, and FIG. 7(B) is a cross-sectional view taken along line B-B in FIG. 7(A).

The method for producing the laser-welded lap joint 1 according to aspects of the present invention is the method for producing the above-described laser-welded lap joint 1 and includes: lapping the plurality of steel sheets vertically; and then applying a laser beam to the surface of an upper steel sheet of the plurality of lapped steel sheets to thereby form a weld zone 4.

In accordance with aspects of the present invention, one-side welding is performed on the plurality of lapped steel sheets. By performing one-side welding, space-saving can be achieved. In the one-side welding, it is preferable that laser lap welding is performed from the side on which a thicker steel sheet among the plurality of lapped steel sheets is disposed. In this manner, the occurrence of burn through can be prevented. When the steel sheets have the same thickness, laser lap welding may be performed from any side.

In the example shown in FIG. 6, the laser-welded lap joint 1 according to aspects of the present invention can be obtained by laser lap welding. Specifically, the steel sheets 2 and 3 are lapped, and the laser beam 7 is applied to the surface of the outermost steel sheet 2 so as to form the weld zone 4 having a linear portion and a semicircular portion in the steel sheets 2 and 3.

In the laser lap welding described above, the laser beam 7 is continuously applied while scanned so as to form the linear portion and the curve portion. As shown in FIG. 6, the weld zone 4 formed has the liner portion and the semicircular portion that serve as the main weld zone 4a and the weld terminal end zone 4b, respectively. In this case, it is preferable that, after the linear portion is welded, the laser beam 7 is directed to the semi-circular portion in a continuous manner. This is because excessive stress concentration on the terminal end portion of the weld zone 4 (see FIG. 2(B)) can be prevented and the occurrence of cracking can be prevented.

In accordance with aspects of the present invention, it is preferable that the J shape is formed by controlling at least one of laser power, a focal position, welding speed, and a beam diameter such that the length $L_1$ (mm) of the main weld zone 4a of the weld zone is ⅔ or more and ⅘ or less of the full length L (mm) of the weld zone 4 that is represented by formula (1) above, that the radius R (mm) of the weld terminal end zone 4b of the weld zone satisfies formula (2), and that the angle θ (rad) of the weld terminal end zone 4b satisfies formula (3).

Examples of the laser beam that can be used include a fiber laser and a disk laser. It is preferable that the beam diameter is 0.4 to 1.0 mm, that the laser power is 2.0 to 5.0 kW, that the focal position is located in the range extending from the surface of the outermost steel sheet to a position 30 mm above the surface of the outermost steel sheet, and that the welding speed is 2.0 to 5.0 m/min.

During the formation of the main weld zone 4a, it is more preferable to control the beam diameter within the range of 0.5 to 0.8 mm, the laser power within the range of 2.5 to 4.5 kW, the focal position within the range extending from the surface of the uppermost steel sheet to a position 20 mm above the surface of the uppermost steel sheet, and the welding speed within the range of 2.5 to 4.5 m/min.

During the formation of the weld terminal end zone 4b, it is preferable to control the beam diameter within the range of 0.4 to 1.0 mm, the laser power within the range of 2.0 to 4.0 kW, the focal position within the range extending from the surface of the uppermost steel sheet to a position 30 mm above the surface of the uppermost steel sheet, and the welding speed within the range of 2.0 to 4.0 m/min.

In accordance with aspects of the present invention, the steel sheets 2 and 3 used may be, for example, steel sheets having the above-described chemical composition and having a tensile strength TS of 980 MPa or more. As for the thicknesses t'2 and t'3 of the steel sheets 2 and 3, 0.5 mm≤t'2≤2.5 mm holds, and 0.5 mm≤t'3≤2.5 mm holds. The sheet gap may be 0% or more and 15% or less of the total thickness.

In the example shown in FIG. 6, only the linear portion and the semicircular portion are formed as the weld zone 4. However, as for the line shape of the weld terminal end zone 4b, a circular shape may be used instead of the semicircular shape, and the above-described effects according to aspects of the invention can be obtained also in this case.

Next, an example of a preferred welding position in the laser-welded lap joint 1 according to aspects of the present invention will be described using FIG. 7. In the description of FIG. 7, the steel sheet 2 is referred to also as a flange portion 2b, and the steel sheet 3 is referred to also as an additional frame component or a panel component. As shown in FIG. 7, it is preferable that the weld zone 4 is formed such that the center line Z of the main weld zone 4a is substantially parallel to the longitudinal direction of the flange portion 2b of the steel sheet 2.

In accordance with aspects of the present invention, at least one steel sheet of the plurality of lapped steel sheets may have a substantially hat-shaped or L-shaped cross-sectional shape and may include a vertical wall portion and a flange portion extending outward from an end of the vertical wall portion. In a coordinate system in which the coordinate of the vertical wall portion-side end of the joint surface between the flange portion and the other steel sheet is set to 0, in which the vertical wall portion side is set to (+), and in which an outer end side of the flange portion that is opposite to the vertical wall portion side is set to (−), it is preferable that the weld zone is located at a welding position X (mm) represented by formula (4) below. A specific description will be given with reference to FIG. 7.

In the example shown in FIGS. 7(A) and 7(B), the coordinate of the vertical wall portion 2a-side end (hereinafter may be referred to as a contact end) of the contact portion between the flange portion 2b that is the upper steel sheet 2 and the frame component that is the lower steel sheet 3 is set to 0. In this coordinate system, the outer end side of the flange portion 2b is set to (−), and the vertical wall portion 2a-side in the substantially hat shape (only part of the shape is shown in FIG. 7) is set to (+). In the frame component having the substantially hat shape, the thickness of a thickest steel sheet is denoted by t (mm). In this case, it is preferable to perform welding at the welding position X (mm) represented by formula (4) below by applying the one-side welding method. In this manner, an L-form tension test piece shown in FIG. 8, including two lapped sheets, having a total thickness of 2 to 5 mm, and having a flange length of 50 mm can have a peeling strength of 1.2 kN or more.

$$-2t \geq X \geq -4t \quad (4)$$

The reason that X is set so as to satisfy formula (4) above will be described.

If the welding position X is closer to the contact end of the flange portion 2b than −2t, rupture tends to occur from the weld metal portion during the tensile test, and the peeling strength may also decrease. If the welding position X is farther from the contact end of the flange portion 2b than −4t, the moment applied to the weld zone 4 tends to increase, and the peeling strength may decrease. It is therefore preferable to set the welding position X so as to satisfy formula (4) above. The welding position X is the distance from a coordinate of 0 to the center line Z of the main weld zone 4a.

<Automobile Frame Component>

One example of a component for which the laser-welded lap joint 1 according to aspects of the present invention can be preferably used is an automobile frame component. In the automobile frame component shown in FIG. 1, the steel sheet 2 that is a frame component having a hat-shaped cross-sectional shape and the steel sheet 3 that is a panel component are used. The flange portion 2b of the frame component (the steel sheet 2 shown in FIG. 1) and the panel component (the steel sheet 3 shown in FIG. 1) disposed so as to face the flange portion 2b are welded by the above-described welding method to form the weld zones 4, and a closed cross section is thereby formed.

The automobile frame component according to aspects of the present invention is preferably used, for example, for center pillars, roof rails, etc. It is important in terms of collision safety that these components have sufficient peeling strength. A center pillar to which the automobile frame component according to aspects of the present invention is applied has sufficient peeling strength as described above.

As described above, in accordance with aspects of the present invention, a plurality of steel sheets including at least one high-tensile steel sheet are lapped, and a weld zone 4 is formed to weld and join the plurality of steel sheets together. In this manner, a laser-welded lap joint 1 with no weld defects formed on the front and back surfaces of the steel sheets can be obtained.

In accordance with aspects of the present invention, the occurrence of cracking in the terminal end portion of the weld zone 4 and propagation of the cracking can be prevented, and therefore the laser-welded lap joint 1 produced can have high joint strength and excellent durability.

Moreover, even when the length of the fusion zone is shorter than that in conventional laser welding, the occurrence of weld cracking can be prevented. It is therefore expected that flexibility in the design of components is improved and the strength is improved by welding many portions necessary to have high peeling strength.

Moreover, since the laser-welded lap joint 1 according to aspects of the present invention has good appearance, it can be used preferably for structural members of automobiles. For example, by using high-strength steel sheets as the steel sheets to be joined, an automobile frame component can be obtained. By using such a laser-welded lap joint 1, an automobile frame component etc. with high joint strength can be obtained.

EXAMPLES

The operations and effects according to aspects of the present invention will be described by way of Examples. However, the present invention is not limited to the following Examples.

In the Examples, steel sheets having chemical compositions shown in Table 1 were used as test specimens.

Figure 8:
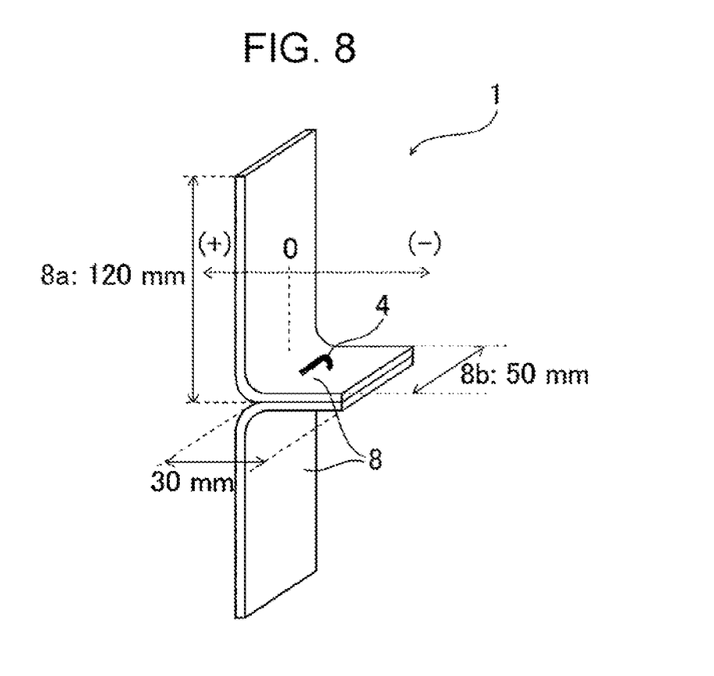
FIG. 8 is an illustration showing an example of a laser-welded lap joint in an Example of the present invention.

The thickness of each steel sheet is 1.2 mm, 1.6 mm, or 2.0 mm, and its width is 50 mm. These steel sheets were used and bent into a shape with an L-shaped cross section as shown in FIG. 8. The L-shaped steel sheets each have a long-side portion 8a and a short-side portion 8b. The long-side portion 8a corresponds to the vertical wall portion 2a of the steel sheet 2 of the laser-welded joint 1 shown in FIG. 1, and the short-side portion 8b corresponds to the flange portion 2b.

Two L-shaped steel sheets of the same type and having the same thickness were used, and the short-side portions 8b of the steel sheets were lapped. Then laser welding was performed at a plurality of positions of the lapped portion intermittently in a longitudinal direction to form weld beads (weld zones 4), and an L-shaped-test piece (hereinafter referred to as a test piece) was thereby produced. As for the size of the test piece, the size of the long-side portion 8a (the length of the vertical wall) was 120 mm, the size of the short-side portion 8b (the width of the test piece) was 50 mm, the size of the lapped portion (the width of the flange) was 30 mm, and the gap between the upper and lower steel sheets was 0.2 mm.

The conditions for the weld zones 4 formed by the laser welding are shown in Tables 2-1, 2-2, and 2-3.

The coordinate of the welding position is represented in a coordinate system in which an end of the contact position between the two lapped steel sheets 8 of the test piece is set to 0, in which the outer end side of the lapped portion of the test piece is set to (−), and in which the vertical wall side of the test piece is set to (+). The welding position is denoted by X, and the full length of the fusion zone 4 is denoted by L. The radius of the arcuate or circular shape in the terminal end portion (the weld terminal end zone 4b) of the weld zone 4 is denoted by R, and the angle of the arcuate or circular shape in the terminal end portion (the weld terminal end zone 4b) of the weld zone 4 is denoted by θ. The test was performed on various test pieces with different welding positions X, different full lengths L, different radii R, and different angles θ.

A fiber laser was used for the laser welding. In the laser lap welding, the laser power was 4.5 kW, and the beam diameter at the focal position was set to a constant value of 0.6 mm φ. The welding speed and a work distance were controlled to adjust the penetration of the weld bead. The welding was performed in air. The focal position during laser welding was set to the steel sheet surface of the short-side portion 8b.

The tensile test was performed according to JIS Z3136 at a speed of 10 mm/min. The occurrence of cracking was determined by visual inspection and a liquid penetrant test.

The peeling strength was measured by an L-from tension test. Specifically, steel sheets 8 bent into an L shape were lapped as shown in FIG. 8 and laser-welded, and a tensile load was applied from opposite sides. A tensile method according to JIS Z3136 was performed. When the peeling strength was 1.2 kN or more, the test piece was regarded as having high joint strength and rated pass.

The obtained judgement results for weld cracking and peeling strength are shown in Tables 2-1, 2-2, and 2-3.

TABLE 1

| Steel type | Chemical composition (% by mass) | | | | | | | | | | | |
|---|---|---|---|---|---|---|---|---|---|---|---|---|
| | C | Si | Mn | P | S | Nb | Ti | Cr | Mo | B | Al | N |
| A | 0.13 | 1.4 | 2.2 | 0.015 | 0.002 | — | — | — | — | — | 0.032 | 0.0045 |
| B | 0.12 | 1.4 | 2.0 | 0.015 | 0.002 | 0.044 | 0.005 | — | — | — | 0.031 | 0.0040 |
| C | 0.13 | 1.3 | 2.0 | 0.014 | 0.002 | — | — | 0.019 | 0.010 | 0.0001 | 0.028 | 0.0050 |
| D | 0.13 | 1.4 | 2.1 | 0.013 | 0.002 | 0.038 | 0.005 | 0.020 | 0.010 | 0.0001 | 0.028 | 0.0033 |
| E | 0.13 | 1.4 | 2.2 | 0.012 | 0.001 | — | — | — | — | — | 0.035 | 0.0040 |
| F | 0.13 | 1.4 | 2.1 | 0.013 | 0.002 | 0.002 | 0.004 | — | — | — | 0.033 | 0.0040 |
| G | 0.13 | 1.3 | 2.2 | 0.013 | 0.001 | — | — | 0.021 | 0.020 | 0.0002 | 0.029 | 0.0040 |
| H | 0.12 | 1.4 | 2.1 | 0.014 | 0.002 | 0.040 | 0.005 | 0.023 | 0.020 | 0.0002 | 0.030 | 0.0050 |

TABLE 2-1

| Test No. | Steel type | TS (MPa) | Thickness t'2 of steel sheet 2 (mm) | Thickness t'3 of steel sheet 2 (mm) | Thickness t of thickest steel sheet in component (mm) | Total thickness T (mm) | Total sheet gap G (mm) | Welding position X (mm) |
|---|---|---|---|---|---|---|---|---|
| 1 | A | 980 | 1.2 | 1.2 | 1.2 | 2.4 | 0.2 | −3.6 |
| 2 | A | 980 | 1.2 | 1.2 | 1.2 | 2.4 | 0.4 | −3.6 |
| 4 | A | 980 | 1.2 | 1.2 | 1.2 | 2.4 | 0.2 | −3.6 |
| 5 | A | 980 | 1.2 | 1.2 | 1.2 | 2.4 | 0.2 | −3.6 |
| 6 | A | 980 | 1.2 | 1.2 | 1.2 | 2.4 | 0.2 | −3.6 |
| 7 | A | 980 | 1.2 | 1.2 | 1.2 | 2.4 | 0.2 | −3.6 |
| 8 | E | 1180 | 1.2 | 1.2 | 1.2 | 2.4 | 0.2 | −3.6 |
| 9 | E | 1180 | 1.2 | 1.2 | 1.2 | 2.4 | 0.4 | −3.6 |
| 11 | E | 1180 | 1.2 | 1.2 | 1.2 | 2.4 | 0.2 | −3.6 |
| 12 | E | 1180 | 1.2 | 1.2 | 1.2 | 2.4 | 0.2 | −3.6 |
| 13 | E | 1180 | 1.2 | 1.2 | 1.2 | 2.4 | 0.2 | −3.6 |
| 14 | E | 1180 | 1.2 | 1.2 | 1.2 | 2.4 | 0.2 | −3.6 |
| 15 | B | 980 | 1.6 | 1.6 | 1.6 | 3.2 | 0.3 | −4.8 |
| 16 | B | 980 | 1.6 | 1.6 | 1.6 | 3.2 | 0.5 | −4.8 |
| 18 | B | 980 | 1.6 | 1.6 | 1.6 | 3.2 | 0.3 | −4.8 |
| 19 | B | 980 | 1.6 | 1.6 | 1.6 | 3.2 | 0.3 | −4.8 |
| 20 | B | 980 | 1.6 | 1.6 | 1.6 | 3.2 | 0.3 | −4.8 |
| 21 | B | 980 | 1.6 | 1.6 | 1.6 | 3.2 | 0.3 | −4.8 |
| 22 | F | 1180 | 1.6 | 1.6 | 1.6 | 3.2 | 0.3 | −4.8 |
| 23 | F | 1180 | 1.6 | 1.6 | 1.6 | 3.2 | 0.5 | −4.8 |
| 25 | F | 1180 | 1.6 | 1.6 | 1.6 | 3.2 | 0.3 | −4.8 |
| 26 | F | 1180 | 1.6 | 1.6 | 1.6 | 3.2 | 0.3 | −4.8 |
| 27 | F | 1180 | 1.6 | 1.6 | 1.6 | 3.2 | 0.3 | −4.8 |
| 28 | F | 1180 | 1.6 | 1.6 | 1.6 | 3.2 | 0.3 | −4.8 |
| 29 | C | 980 | 2.0 | 2.0 | 2.0 | 4.0 | 0.4 | −6.0 |
| 30 | C | 980 | 2.0 | 2.0 | 2.0 | 4.0 | 0.7 | −6.0 |
| 32 | C | 980 | 2.0 | 2.0 | 2.0 | 4.0 | 0.4 | −6.0 |
| 33 | C | 980 | 2.0 | 2.0 | 2.0 | 4.0 | 0.4 | −6.0 |
| 34 | C | 980 | 2.0 | 2.0 | 2.0 | 4.0 | 0.4 | −6.0 |
| 35 | C | 980 | 2.0 | 2.0 | 2.0 | 4.0 | 0.4 | −6.0 |

| Test No. | Full length L of weld zone (mm) | Radius R of weld terminal end zone (mm) | Angle θ of weld terminal end zone (rad) | Length $L_1$ of main weld zone (mm) | Main weld zone/full length of weld zone $L_1/L$ | Weld cracking | Peeling strength (kN) | Remarks |
|---|---|---|---|---|---|---|---|---|
| 1 | 10.0 | 1.0 | π | 6.9 | 0.69 | No | 1.5 | Inventive Example |
| 2 | 10.0 | 1.0 | π | 6.9 | 0.69 | Yes | 0.9 | Comparative Example |
| 4 | 5.0 | 1.0 | π | 1.9 | 0.37 | Yes | 0.5 | Comparative Example |
| 5 | 10.0 | 2.0 | π | 3.7 | 0.37 | Yes | 0.8 | Comparative Example |
| 6 | 10.0 | 0.3 | π | 9.1 | 0.91 | Yes | 1.0 | Comparative Example |
| 7 | 10.0 | 1.0 | 1/2π | 8.4 | 0.84 | Yes | 1.1 | Comparative Example |
| 8 | 10.0 | 1.0 | π | 6.9 | 0.69 | No | 1.3 | Inventive Example |
| 9 | 10.0 | 1.0 | π | 6.9 | 0.69 | Yes | 0.8 | Comparative Example |
| 11 | 5.0 | 1.0 | π | 1.9 | 0.37 | Yes | 0.5 | Comparative Example |
| 12 | 10.0 | 2.0 | π | 3.7 | 0.37 | Yes | 0.8 | Comparative Example |
| 13 | 10.0 | 0.3 | π | 9.1 | 0.91 | Yes | 0.8 | Comparative Example |
| 14 | 10.0 | 1.0 | 1/2π | 8.4 | 0.84 | Yes | 1.0 | Comparative Example |
| 15 | 10.0 | 1.0 | π | 6.9 | 0.69 | No | 1.5 | Inventive Example |
| 16 | 10.0 | 1.0 | π | 6.9 | 0.69 | Yes | 1.0 | Comparative Example |
| 18 | 5.0 | 1.0 | π | 1.9 | 0.37 | Yes | 0.4 | Comparative Example |
| 19 | 10.0 | 2.0 | π | 3.7 | 0.37 | Yes | 0.7 | Comparative Example |
| 20 | 10.0 | 0.3 | π | 9.1 | 0.91 | Yes | 0.8 | Comparative Example |
| 21 | 10.0 | 1.0 | 1/2π | 8.4 | 0.84 | Yes | 0.9 | Comparative Example |
| 22 | 10.0 | 1.0 | π | 6.9 | 0.69 | No | 1.3 | Inventive Example |

TABLE 2-1-continued

| Test No. | Full length L of weld zone (mm) | Radius R of weld terminal end zone (mm) | Angle θ of weld terminal end zone (rad) | Length L₁ of main weld zone (mm) | Main weld zone/full length of weld zone L₁/L | Weld cracking | Peeling strength (kN) | Remarks |
|---|---|---|---|---|---|---|---|---|
| 23 | 10.0 | 1.0 | $\pi$ | 6.9 | 0.69 | Yes | 0.9 | Comparative Example |
| 25 | 5.0 | 1.0 | $\pi$ | 1.9 | 0.37 | Yes | 0.4 | Comparative Example |
| 26 | 10.0 | 2.0 | $\pi$ | 3.7 | 0.37 | Yes | 0.7 | Comparative Example |
| 27 | 10.0 | 0.3 | $\pi$ | 9.1 | 0.91 | Yes | 0.7 | Comparative Example |
| 28 | 10.0 | 1.0 | $1/2\pi$ | 8.4 | 0.84 | Yes | 0.9 | Comparative Example |
| 29 | 10.0 | 1.0 | $\pi$ | 6.9 | 0.69 | No | 1.2 | Inventive Example |
| 30 | 10.0 | 1.0 | $\pi$ | 6.9 | 0.69 | Yes | 0.6 | Comparative Example |
| 32 | 5.0 | 1.0 | $\pi$ | 1.9 | 0.37 | Yes | 0.4 | Comparative Example |
| 33 | 10.0 | 2.0 | $\pi$ | 3.7 | 0.37 | Yes | 0.9 | Comparative Example |
| 34 | 10.0 | 0.3 | $\pi$ | 9.1 | 0.91 | Yes | 0.8 | Comparative Example |
| 35 | 10.0 | 1.0 | $1/2\pi$ | 8.4 | 0.84 | Yes | 0.9 | Comparative Example |

TABLE 2-2

| Test No. | Steel type | TS (MPa) | Thickness t'2 of steel sheet 2 (mm) | Thickness t'3 of steel sheet 2 (mm) | Thickness t of thickest steel sheet in component (mm) | Total thickness T (mm) | Total sheet gap G (mm) | Welding position X (mm) |
|---|---|---|---|---|---|---|---|---|
| 36 | G | 1180 | 2.0 | 2.0 | 2.0 | 4.0 | 0.4 | −6.0 |
| 37 | G | 1180 | 2.0 | 2.0 | 2.0 | 4.0 | 0.7 | −6.0 |
| 39 | G | 1180 | 2.0 | 2.0 | 2.0 | 4.0 | 0.4 | −6.0 |
| 40 | G | 1180 | 2.0 | 2.0 | 2.0 | 4.0 | 0.4 | −6.0 |
| 41 | G | 1180 | 2.0 | 2.0 | 2.0 | 4.0 | 0.4 | −6.0 |
| 42 | G | 1180 | 2.0 | 2.0 | 2.0 | 4.0 | 0.4 | −6.0 |
| 43 | A | 980 | 1.2 | 1.2 | 1.2 | 2.4 | 0.2 | −3.6 |
| 44 | A | 980 | 1.2 | 1.2 | 1.2 | 2.4 | 0.2 | −3.6 |
| 45 | D | 980 | 1.6 | 1.6 | 1.6 | 3.2 | 0.3 | −4.8 |
| 46 | D | 980 | 1.6 | 1.6 | 1.6 | 3.2 | 0.3 | −4.8 |
| 47 | C | 980 | 2.0 | 2.0 | 2.0 | 4.0 | 0.4 | −6.0 |
| 48 | C | 980 | 2.0 | 2.0 | 2.0 | 4.0 | 0.4 | −6.0 |
| 49 | E | 1180 | 1.2 | 1.2 | 1.2 | 2.4 | 0.2 | −3.6 |
| 50 | E | 1180 | 1.2 | 1.2 | 1.2 | 2.4 | 0.2 | −3.6 |
| 51 | H | 1180 | 1.6 | 1.6 | 1.6 | 3.2 | 0.3 | −4.8 |
| 52 | H | 1180 | 1.6 | 1.6 | 1.6 | 3.2 | 0.3 | −4.8 |
| 53 | G | 1180 | 2.0 | 2.0 | 2.0 | 4.0 | 0.4 | −6.0 |
| 54 | G | 1180 | 2.0 | 2.0 | 2.0 | 4.0 | 0.4 | −6.0 |
| 55 | A | 980 | 1.2 | 1.2 | 1.2 | 2.4 | 0 | −3.6 |
| 56 | D | 980 | 1.6 | 1.6 | 1.6 | 3.2 | 0 | −4.8 |
| 57 | C | 980 | 2.0 | 2.0 | 2.0 | 4.0 | 0 | −6.0 |
| 58 | E | 1180 | 1.2 | 1.2 | 1.2 | 2.4 | 0 | −3.6 |
| 59 | H | 1180 | 1.6 | 1.6 | 1.6 | 3.2 | 0 | −4.8 |
| 60 | G | 1180 | 2.0 | 2.0 | 2.0 | 4.0 | 0 | −6.0 |
| 61 | A | 980 | 1.2 | 1.2 | 1.2 | 2.4 | 0.2 | −3.6 |
| 62 | D | 980 | 1.6 | 1.6 | 1.6 | 3.2 | 0.3 | −4.8 |
| 63 | C | 980 | 2.0 | 2.0 | 2.0 | 4.0 | 0.4 | −6.0 |
| 64 | E | 1180 | 1.2 | 1.2 | 1.2 | 2.4 | 0.2 | −3.6 |
| 65 | H | 1180 | 1.6 | 1.6 | 1.6 | 3.2 | 0.3 | −4.8 |
| 66 | G | 1180 | 2.0 | 2.0 | 2.0 | 4.0 | 0.4 | −6.0 |
| 67 | A | 980 | 1.2 | 1.2 | 1.2 | 2.4 | 0.2 | −3.6 |
| 68 | D | 980 | 1.6 | 1.6 | 1.6 | 3.2 | 0.3 | −4.8 |
| 69 | C | 980 | 2.0 | 2.0 | 2.0 | 4.0 | 0.4 | −6.0 |
| 70 | E | 1180 | 1.2 | 1.2 | 1.2 | 2.4 | 0.2 | −3.6 |

| Test No. | Full length L of weld zone (mm) | Radius R of weld terminal end zone (mm) | Angle θ of weld terminal end zone (rad) | Length L₁ of main weld zone (mm) | Main weld zone/full length of weld zone L₁/L | Weld cracking | Peeling strength (kN) | Remarks |
|---|---|---|---|---|---|---|---|---|
| 36 | 10.0 | 1.0 | $\pi$ | 6.9 | 0.69 | No | 1.2 | Inventive Example |
| 37 | 10.0 | 1.0 | $\pi$ | 6.9 | 0.69 | Yes | 1.0 | Comparative Example |
| 39 | 5.0 | 1.0 | $\pi$ | 1.9 | 0.37 | Yes | 0.3 | Comparative Example |
| 40 | 10.0 | 2.0 | $\pi$ | 3.7 | 0.37 | Yes | 0.7 | Comparative Example |
| 41 | 10.0 | 0.3 | $\pi$ | 9.1 | 0.91 | Yes | 0.7 | Comparative Example |
| 42 | 10.0 | 1.0 | $1/2\pi$ | 8.4 | 0.84 | Yes | 0.8 | Comparative Example |
| 43 | 15.0 | 1.0 | $6/5\pi$ | 11.2 | 0.75 | No | 2.3 | Inventive Example |
| 44 | 20.0 | 1.0 | $5/3\pi$ | 14.8 | 0.74 | No | 2.9 | Inventive Example |
| 45 | 15.0 | 1.0 | $6/5\pi$ | 11.2 | 0.75 | No | 2.1 | Inventive Example |
| 46 | 20.0 | 1.0 | $5/3\pi$ | 14.8 | 0.74 | No | 3.0 | Inventive Example |
| 47 | 15.0 | 1.0 | $6/5\pi$ | 11.2 | 0.75 | No | 2.3 | Inventive Example |
| 48 | 20.0 | 1.0 | $5/3\pi$ | 14.8 | 0.74 | No | 2.8 | Inventive Example |
| 49 | 15.0 | 1.0 | $6/5\pi$ | 11.2 | 0.75 | No | 2.0 | Inventive Example |
| 50 | 20.0 | 1.0 | $5/3\pi$ | 14.8 | 0.74 | No | 2.7 | Inventive Example |
| 51 | 15.0 | 1.0 | $6/5\pi$ | 11.2 | 0.75 | No | 1.9 | Inventive Example |

TABLE 2-2-continued

| Test No. | Full length L of weld zone (mm) | Radius R of weld terminal end zone (mm) | Angle θ of weld terminal end zone (rad) | Length L₁ of main weld zone (mm) | Main weld zone/full length of weld zone L₁/L | Weld cracking | Peeling strength (kN) | Remarks |
|---|---|---|---|---|---|---|---|---|
| 52 | 20.0 | 1.0 | $5/3\pi$ | 14.8 | 0.74 | No | 3.1 | Inventive Example |
| 53 | 15.0 | 1.0 | $6/5\pi$ | 11.2 | 0.75 | No | 2.3 | Inventive Example |
| 54 | 20.0 | 1.0 | $5/3\pi$ | 14.8 | 0.74 | No | 2.9 | Inventive Example |
| 55 | 10.0 | 1.0 | $\pi$ | 6.9 | 0.69 | No | 1.4 | Inventive Example |
| 56 | 10.0 | 1.0 | $\pi$ | 6.9 | 0.69 | No | 1.4 | Inventive Example |
| 57 | 10.0 | 1.0 | $\pi$ | 6.9 | 0.69 | No | 1.3 | Inventive Example |
| 58 | 10.0 | 1.0 | $\pi$ | 6.9 | 0.69 | No | 1.2 | Inventive Example |
| 59 | 10.0 | 1.0 | $\pi$ | 6.9 | 0.69 | No | 1.5 | Inventive Example |
| 60 | 10.0 | 1.0 | $\pi$ | 6.9 | 0.69 | No | 1.2 | Inventive Example |
| 61 | 40.0 | 1.5 | $11/6\pi$ | 31.4 | 0.78 | No | 4.2 | Inventive Example |
| 62 | 40.0 | 1.5 | $11/6\pi$ | 31.4 | 0.78 | No | 4.1 | Inventive Example |
| 63 | 40.0 | 1.5 | $11/6\pi$ | 31.4 | 0.78 | No | 3.9 | Inventive Example |
| 64 | 40.0 | 1.5 | $11/6\pi$ | 31.4 | 0.78 | No | 4.3 | Inventive Example |
| 65 | 40.0 | 1.5 | $11/6\pi$ | 31.4 | 0.78 | No | 3.8 | Inventive Example |
| 66 | 40.0 | 1.5 | $11/6\pi$ | 31.4 | 0.78 | No | 4.5 | Inventive Example |
| 67 | 30.0 | 2.0 | $\pi$ | 23.7 | 0.79 | Yes | 2.7 | Comparative Example |
| 68 | 30.0 | 2.0 | $\pi$ | 23.7 | 0.79 | Yes | 3.2 | Comparative Example |
| 69 | 30.0 | 2.0 | $\pi$ | 23.7 | 0.79 | Yes | 2.6 | Comparative Example |
| 70 | 30.0 | 2.0 | $\pi$ | 23.7 | 0.79 | Yes | 3.3 | Comparative Example |

TABLE 2-3

| Test No. | Steel type | TS (MPa) | Thickness t'2 of steel sheet 2 (mm) | Thickness t'3 of steel sheet 2 (mm) | Thickness t of thickest steel sheet in component (mm) | Total thickness T (mm) | Total sheet gap G (mm) | Welding position X (mm) |
|---|---|---|---|---|---|---|---|---|
| 71 | H | 1180 | 1.6 | 1.6 | 1.6 | 3.2 | 0.3 | −4.8 |
| 72 | G | 1180 | 2.0 | 2.0 | 2.0 | 4.0 | 0.4 | −6.0 |
| 73 | A | 980 | 1.2 | 1.2 | 1.2 | 2.4 | 0.2 | −3.6 |
| 74 | D | 980 | 1.6 | 1.6 | 1.6 | 3.2 | 0.3 | −4.8 |
| 75 | C | 980 | 2.0 | 2.0 | 2.0 | 4.0 | 0.4 | −6.0 |
| 76 | E | 1180 | 1.2 | 1.2 | 1.2 | 2.4 | 0.2 | −3.6 |
| 77 | H | 1180 | 1.6 | 1.6 | 1.6 | 3.2 | 0.3 | −4.8 |
| 78 | G | 1180 | 2.0 | 2.0 | 2.0 | 4.0 | 0.4 | −6.0 |
| 79 | A | 980 | 1.2 | 1.2 | 1.2 | 2.4 | 0.2 | −3.6 |
| 80 | D | 980 | 1.6 | 1.6 | 1.6 | 3.2 | 0.3 | −4.8 |
| 81 | C | 980 | 2.0 | 2.0 | 2.0 | 4.0 | 0.4 | −6.0 |
| 82 | E | 1180 | 1.2 | 1.2 | 1.2 | 2.4 | 0.2 | −3.6 |
| 83 | H | 1180 | 1.6 | 1.6 | 1.6 | 3.2 | 0.3 | −4.8 |
| 84 | G | 1180 | 2.0 | 2.0 | 2.0 | 4.0 | 0.4 | −6.0 |

| Test No. | Full length L of weld zone (mm) | Radius R of weld terminal end zone (mm) | Angle θ of weld terminal end zone (rad) | Length L₁ of main weld zone (mm) | Main weld zone/full length of weld zone L₁/L | Weld cracking | Peeling strength (kN) | Remarks |
|---|---|---|---|---|---|---|---|---|
| 71 | 30.0 | 2.0 | $\pi$ | 23.7 | 0.79 | Yes | 2.9 | Comparative Example |
| 72 | 30.0 | 2.0 | $\pi$ | 23.7 | 0.79 | Yes | 3.1 | Comparative Example |
| 73 | 40.0 | 2.0 | $11/6\pi$ | 28.5 | 0.71 | Yes | 3.8 | Comparative Example |
| 74 | 40.0 | 2.0 | $11/6\pi$ | 28.5 | 0.71 | Yes | 3.9 | Comparative Example |
| 75 | 40.0 | 2.0 | $11/6\pi$ | 28.5 | 0.71 | Yes | 3.1 | Comparative Example |
| 76 | 40.0 | 2.0 | $11/6\pi$ | 28.5 | 0.71 | Yes | 4.3 | Comparative Example |
| 77 | 40.0 | 2.0 | $11/6\pi$ | 28.5 | 0.71 | Yes | 3.2 | Comparative Example |
| 78 | 40.0 | 2.0 | $11/6\pi$ | 28.5 | 0.71 | Yes | 3.7 | Comparative Example |
| 79 | 30.0 | 1.5 | $5/3\pi$ | 22.1 | 0.74 | No | 2.7 | Inventive Example |
| 80 | 30.0 | 1.5 | $5/3\pi$ | 22.1 | 0.74 | No | 3.2 | Inventive Example |
| 81 | 30.0 | 1.5 | $5/3\pi$ | 22.1 | 0.74 | No | 2.6 | Inventive Example |
| 82 | 30.0 | 1.5 | $5/3\pi$ | 22.1 | 0.74 | No | 3.3 | Inventive Example |

TABLE 2-3-continued

| 83 | 30.0 | 1.5 | 5/3π | 22.1 | 0.74 | No | 2.9 | Inventive Example |
| 84 | 30.0 | 1.5 | 5/3π | 22.1 | 0.74 | No | 3.1 | Inventive Example |

As can be seen from Tables 2-1, 2-2, and 2-3, the peeling strength of each of the test pieces in the Inventive Examples was 1.2 kN or more, and no weld cracking occurred.

In test pieces Nos. 2, 9, 16, 23, 30, and 37 in Comparative Examples, the total sheet gap G was larger than 15% of the total thickness T, so that weld cracking occurred.

In Nos. 4, 11, 18, 25, 32, and 39, the full length L of the weld zone 4 was short, so that weld cracking occurred.

In Nos. 5, 12, 19, 26, 33, 40, and 67 to 78, the radius R of the terminal end portion (the weld terminal end zone 4b) of the weld zone 4 was large, so that weld cracking occurred.

In Nos. 6, 13, 20, 27, 34, and 41, the radius R of the terminal end portion (the weld terminal end zone 4b) of the weld zone 4 was small, so that weld cracking occurred.

In Nos. 7, 14, 21, 28, 35, and 42, the angle θ of the terminal end portion (the weld terminal end zone 4b) of the weld zone 4 was small, so that weld cracking occurred.

As described above, in each of the Inventive Examples in which the laser welding was performed according to aspects of the present invention described above, a good laser-welded lap joint was obtained. However, in each of the Comparative Examples not satisfying the welding conditions of the present invention, a good laser-welded lap joint was not obtained.

REFERENCE SIGNS LIST 1 laser-welded lap joint
2 steel sheet
3 steel sheet
4 weld zone
4a main weld zone
4b weld terminal end zone
5 terminal end portion of weld zone
6 central portion serving as final solidification zone
7 laser beam
14 weld zone
15 terminal end portion of weld zone
16 cracking

The invention claimed is:

1. A laser-welded lap joint comprising a weld zone formed by joining a plurality of steel sheets lapped one over another together by laser welding,
wherein the weld zone has a J shape and includes a main weld zone having a linear weld line shape and a weld terminal end zone formed at one end of the main weld zone and having an arcuate or circular weld line shape,
wherein the length Li (mm) of the main weld zone is ⅔ or more and ⅘ or less of the full length L (mm) of the weld zone that is represented by formula (1),
wherein the radius R (mm) of the weld terminal end zone satisfies formula (2), wherein the angle θ (rad) of the weld terminal end zone satisfies formula (3), and
wherein the total size of a gap between the plurality of steel sheets in a lapped portion including the plurality of steel sheets lapped one over another is 0% or more and 15% or less of the total thickness of the plurality of steel sheets:

$$10.0 \leq L; \quad (1)$$

$$0.5 \leq R \leq 1.5; \quad (2)$$

$$\pi \leq \theta \leq 2\pi, \quad (3)$$

where L is the full length (unit: mm) of the weld zone, R is the radius (unit: mm) of the weld terminal end zone in the weld zone, and θ is the angle (unit: rad) of the weld terminal end zone in the weld zone.

2. The laser-welded lap joint according to claim 1, wherein at least one steel sheet of the plurality of steel sheets has a chemical composition containing, in mass %:
C: more than 0.07% and 0.25% or less;
P+S: less than 0.03%;
Mn: 1.8% or more and 3.0% or less; and
Si: more than 1.2% and 1.8% or less,
with the balance being Fe and unavoidable impurities.

3. The laser-welded lap joint according to claim 2, further containing, in addition to the chemical composition, one or two selected from the following groups A and B:
group A: in mass %, one or two selected from
Ti: 0.005% or more and 0.01% or less and
Nb: 0.005% or more and less than 0.050%, and
group B: in mass %, one or two or more selected from
Cr: 1.0% or less,
Mo: 0.50% or less, and
B: 0.10% or less.

4. The laser-welded lap joint according to claim 3, wherein at least one steel sheet of the plurality of steel sheets is a high-tensile steel sheet with a tensile strength of 980 MPa or more.

5. The laser-welded lap joint according to claim 4, wherein at least one steel sheet of the plurality of steel sheets has a substantially hat-shaped or L-shaped cross section and has a vertical wall portion and a flange portion extending outward from one end of the vertical wall portion, and
wherein, in a coordinate system in which the coordinate of a vertical wall portion-side end of a joint surface between the flange portion and another one of the steel sheets that is lapped on the flange portion is set to 0, in which a vertical wall portion side is set to (+), and in which an outer end side of the flange portion that is opposite to the vertical wall portion side is set to (−), the weld zone is located at a welding position X (mm) represented by formula (4)

$$-2t \geq X \geq -4t \quad (4)$$

where t is the thickness (unit: mm) of a thickest steel sheet of the plurality of steel sheets.

6. The laser-welded lap joint according to claim 3, wherein at least one steel sheet of the plurality of steel sheets has a substantially hat-shaped or L-shaped cross section and has a vertical wall portion and a flange portion extending outward from one end of the vertical wall portion, and
wherein, in a coordinate system in which the coordinate of a vertical wall portion-side end of a joint surface between the flange portion and another one of the steel sheets that is lapped on the flange portion is set to 0, in which a vertical wall portion side is set to (+), and in which an outer end side of the flange portion that is opposite to the vertical wall portion side is set to (−), the weld zone is located at a welding position X (mm) represented by formula (4)

$$-2t \geq X \geq -4t \quad (4)$$

where t is the thickness (unit: mm) of a thickest steel sheet of the plurality of steel sheets.

7. The laser-welded lap joint according to claim 2, wherein at least one steel sheet of the plurality of steel sheets is a high-tensile steel sheet with a tensile strength of 980 MPa or more.

8. The laser-welded lap joint according to claim 7, wherein at least one steel sheet of the plurality of steel sheets has a substantially hat-shaped or L-shaped cross section and has a vertical wall portion and a flange portion extending outward from one end of the vertical wall portion, and
wherein, in a coordinate system in which the coordinate of a vertical wall portion-side end of a joint surface between the flange portion and another one of the steel sheets that is lapped on the flange portion is set to 0, in which a vertical wall portion side is set to (+), and in which an outer end side of the flange portion that is opposite to the vertical wall portion side is set to (−), the weld zone is located at a welding position X (mm) represented by formula (4)

$$-2t \geq X \geq -4t \quad (4)$$

where t is the thickness (unit: mm) of a thickest steel sheet of the plurality of steel sheets.

9. The laser-welded lap joint according to claim 2, wherein at least one steel sheet of the plurality of steel sheets has a substantially hat-shaped or L-shaped cross section and has a vertical wall portion and a flange portion extending outward from one end of the vertical wall portion, and
wherein, in a coordinate system in which the coordinate of a vertical wall portion-side end of a joint surface between the flange portion and another one of the steel sheets that is lapped on the flange portion is set to 0, in which a vertical wall portion side is set to (+), and in which an outer end side of the flange portion that is opposite to the vertical wall portion side is set to (−), the weld zone is located at a welding position X (mm) represented by formula (4)

$$-2t \geq X \geq -4t \quad (4)$$

where t is the thickness (unit: mm) of a thickest steel sheet of the plurality of steel sheets.

10. The laser-welded lap joint according to claim 1, wherein at least one steel sheet of the plurality of steel sheets is a high-tensile steel sheet with a tensile strength of 980 MPa or more.

11. The laser-welded lap joint according to claim 10, wherein at least one steel sheet of the plurality of steel sheets has a substantially hat-shaped or L-shaped cross section and has a vertical wall portion and a flange portion extending outward from one end of the vertical wall portion, and
wherein, in a coordinate system in which the coordinate of a vertical wall portion-side end of a joint surface between the flange portion and another one of the steel sheets that is lapped on the flange portion is set to 0, in which a vertical wall portion side is set to (+), and in which an outer end side of the flange portion that is opposite to the vertical wall portion side is set to (−), the weld zone is located at a welding position X (mm) represented by formula (4)

$$-2t \geq X \geq -4t \quad (4)$$

where t is the thickness (unit: mm) of a thickest steel sheet of the plurality of steel sheets.

12. The laser-welded lap joint according to claim 1, wherein at least one steel sheet of the plurality of steel sheets has a substantially hat-shaped or L-shaped cross section and has a vertical wall portion and a flange portion extending outward from one end of the vertical wall portion, and
wherein, in a coordinate system in which the coordinate of a vertical wall portion-side end of a joint surface between the flange portion and another one of the steel sheets that is lapped on the flange portion is set to 0, in which a vertical wall portion side is set to (+), and in which an outer end side of the flange portion that is opposite to the vertical wall portion side is set to (−), the weld zone is located at a welding position X (mm) represented by formula (4)

$$-2t \geq X \geq -4t \quad (4)$$

where t is the thickness (unit: mm) of a thickest steel sheet of the plurality of steel sheets.

13. A method for producing the laser-welded lap joint according to claim 12, the method comprising:
lapping the plurality of steel sheets vertically one over another; and
forming the weld zone by applying a laser beam to a surface of an upper steel sheet of the plurality of steel sheets lapped one over another.

14. The method for producing the laser-welded lap joint according to claim 13, wherein the J shape is formed by controlling at least one of laser power, a focal position, welding speed, and a beam diameter such that the length $L_1$ (mm) of the main weld zone is ⅔ or more and ⅘ or less of the full length L (mm) of the weld zone that is represented by formula (1), that the radius R (mm) of the weld terminal end zone satisfies formula (2), and that the angle θ (rad) of the weld terminal end zone satisfies formula (3).

15. A method for producing the laser-welded lap joint according to claim 1, the method comprising:
lapping the plurality of steel sheets vertically one over another; and
forming the weld zone by applying a laser beam to a surface of an upper steel sheet of the plurality of steel sheets lapped one over another.

16. The method for producing the laser-welded lap joint according to claim 15, wherein the J shape is formed by controlling at least one of laser power, a focal position, welding speed, and a beam diameter such that the length $L_1$ (mm) of the main weld zone is ⅔ or more and ⅘ or less of the full length L (mm) of the weld zone that is represented by formula (1), that the radius R (mm) of the weld terminal end zone satisfies formula (2), and that the angle θ (rad) of the weld terminal end zone satisfies formula (3).

17. An automobile frame component comprising the laser-welded lap joint according to claim 1.

18. An automobile frame component comprising the laser-welded lap joint according to claim 12.

\* \* \* \* \*

UNITED STATES PATENT AND TRADEMARK OFFICE
CERTIFICATE OF CORRECTION

PATENT NO. : 11,638,969 B2
APPLICATION NO. : 17/055734
DATED : May 2, 2023
INVENTOR(S) : Asato Hara and Yasushi Kitani It is certified that error appears in the above-identified patent and that said Letters Patent is hereby corrected as shown below:

In the Claims

In Claim 1, Column 21, Line 59, please delete "Li (mm)" and add – $L_1$ (mm) –;

In Claim 1, Column 22, Line 15, please delete "$\pi \leq \theta \leq 2\pi$, (3)" and add – $\pi < \theta \leq 2\pi$, (3) –.

Signed and Sealed this
Twenty-second Day of October, 2024

*Katherine Kelly Vidal*
Katherine Kelly Vidal
*Director of the United States Patent and Trademark Office*